United States Patent
Green et al.

(10) Patent No.: US 10,443,764 B2
(45) Date of Patent: Oct. 15, 2019

(54) TRANSFER MECHANISM

(71) Applicant: TECHNIP FRANCE, Courbevoie (FR)

(72) Inventors: Andy Green, Invurie (GB); Cedric Mouchel, Aberdeen (GB)

(73) Assignee: TECHNIP FRANCE (FR)

( * ) Notice: Subject to any disclaimer, the term of this patent is extended or adjusted under 35 U.S.C. 154(b) by 565 days.

(21) Appl. No.: 15/038,012

(22) PCT Filed: May 27, 2014

(86) PCT No.: PCT/IB2014/001211
§ 371 (c)(1),
(2) Date: May 19, 2016

(87) PCT Pub. No.: WO2015/075512
PCT Pub. Date: May 28, 2015

(65) Prior Publication Data
US 2016/0298793 A1    Oct. 13, 2016

(30) Foreign Application Priority Data

Nov. 21, 2013   (GB) .................................. 1320601.6

(51) Int. Cl.
*F16L 1/20* (2006.01)
*F16L 1/19* (2006.01)

(52) U.S. Cl.
CPC ............... *F16L 1/207* (2013.01); *F16L 1/19* (2013.01); *F16L 1/203* (2013.01)

(58) Field of Classification Search
CPC combination set(s) only.
See application file for complete search history.

(56) References Cited

U.S. PATENT DOCUMENTS

| 4,061,231 A | 12/1977 | Birdwell |
| 5,188,483 A | 2/1993 | Kopp et al. |
| 5,348,423 A | 9/1994 | Maloberti et al. |
| 6,102,077 A | 8/2000 | Legallais et al. |
| 6,729,802 B2 | 5/2004 | Giovannini et al. |

(Continued)

FOREIGN PATENT DOCUMENTS

| EP | 2 615 343 A2 | 7/2013 |
| FR | 2 953 901 A1 | 6/2011 |

(Continued)

OTHER PUBLICATIONS

Transmittal, International Preliminary Report on Patentability and Written Opinion of the International Searching Authority in corresponding International Application No. PCT/IB2014/001211 dated May 24, 2016.

(Continued)

*Primary Examiner* — Kyle Armstrong
(74) *Attorney, Agent, or Firm* — Ostrolenk Faber LLP

(57) ABSTRACT

A transfer mechanism (28) for providing linear vertical displacement of a fitting (46) on a flexible tubular conduit (48). The transfer mechanism includes a clamping mechanism (34) adapted to connect and secure a fitting (46) on a flexible tubular conduit (48) to the transfer mechanism (28); and a conveyor system (30) configured to linearly displace the clamping mechanism (34) from a first position towards a second position.

21 Claims, 13 Drawing Sheets

(56) References Cited

U.S. PATENT DOCUMENTS

| | | | |
|---|---|---|---|
| 7,182,550 B2 * | 2/2007 | Renkema | B63B 35/03 |
| | | | 405/158 |
| 2007/0177944 A1 | 8/2007 | Smith et al. | |
| 2008/0251484 A1 * | 10/2008 | Commandeur | B66C 23/52 |
| | | | 212/76 |
| 2013/0279989 A1 | 10/2013 | Baylot et al. | |

FOREIGN PATENT DOCUMENTS

| | | | |
|---|---|---|---|
| FR | 2953901 A1 | 6/2011 | |
| GB | 2 303 897 | 3/1997 | |
| WO | WO 98/50719 A1 | 11/1998 | |
| WO | WO 2009/022177 A2 | 2/2009 | |
| WO | WO 2009/134116 A1 | 11/2009 | |
| WO | WO 2012/091556 A1 | 7/2012 | |
| WO | WO-2012091556 A1 * | 7/2012 | F16L 1/19 |
| WO | WO 2012/101232 A2 | 8/2012 | |
| WO | WO 2013/089561 A1 | 6/2013 | |
| WO | WO 2014/120004 A1 | 8/2014 | |

OTHER PUBLICATIONS

Third Party Observation Against corresponding United Kingdom Publication No. GB 2509598 (Application No. GB1320601.6) dated Oct. 23, 2014.
Search Report in corresponding United Kingdom Patent Application No. GB1320601.6 dated Jun. 3, 2014.
International Search Report dated Nov. 21, 2014 issued in corresponding International patent application No. PCT/IB2014/001211.

* cited by examiner

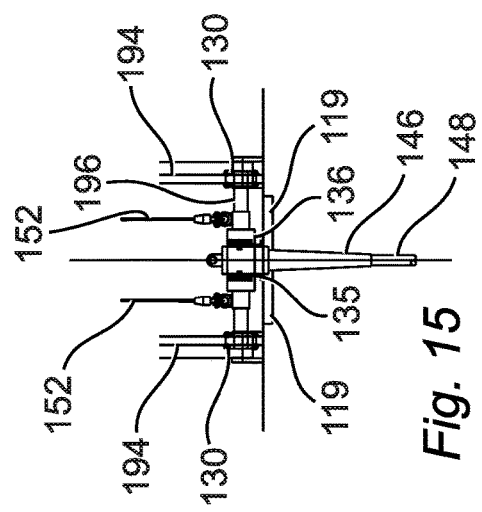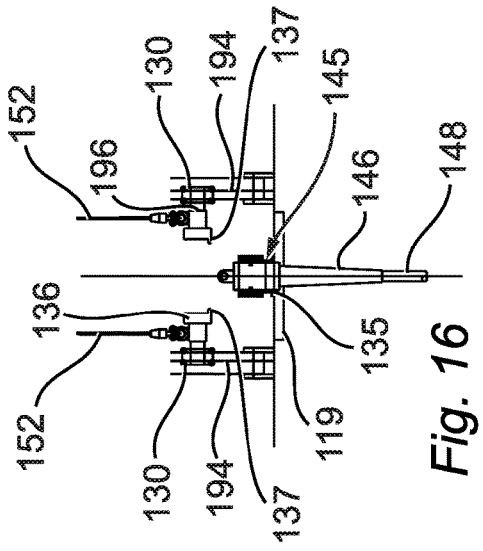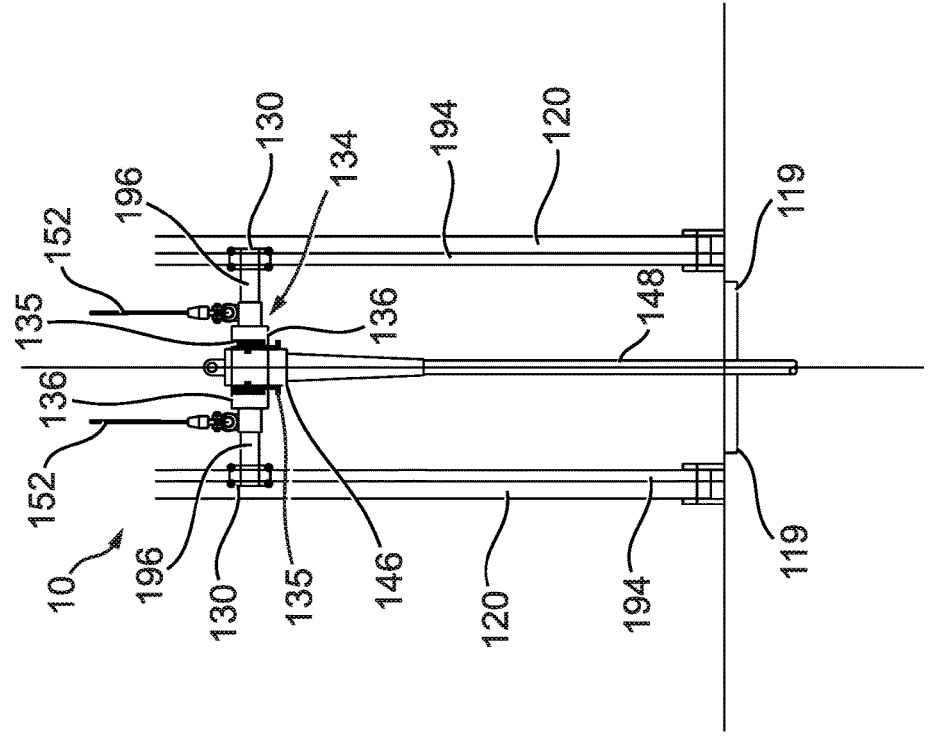

TRANSFER MECHANISM

CROSS REFERENCE TO RELATED APPLICATIONS

The present application is a 35 U.S.C. § 371 National Phase conversion of PCT/IB2014/001211, filed May 27, 2014, claiming the benefit of United Kingdom Application no. 1320601.6, filed Nov. 21, 2013, the disclosure of which is incorporated herein by reference. The PCT International Application was published in the English language.

TECHNICAL FIELD OF THE INVENTION

The present invention relates to a transfer mechanism, in particular, a transfer mechanism for providing vertical displacement of a fitting on a flexible tubular conduit.

BACKGROUND OF THE INVENTION

The laying of flexible tubular conduits subsea is usually preformed from a suitable pipe-laying/pipelay vessel such as a floating platform, barge, ship or other vessel. The flexibly tubular conduit may be one of many different forms. The flexible tubular conduit is preferably a flexible pipe of the unbounded type for conveying hydrocarbons as defined in the American Petroleum Institute Recommendations API17J "Specification for unbounded flexible tubular conduit". However, the flexible tubular conduit may be of the bonded type. The flexible tubular conduit may alternatively be an umbilical as defined in the American Petroleum Institute API17E "Specification for subsea umbilical" third Edition, 2003. Alternatively, the flexible tubular conduit may be an Integrated Production Bundle (IPB) described in the U.S. Pat. No. 6,102,077 and marketed by the applicant under the registered trademark ISU® (Integrated Subsea Umbilical).

The flexible tubular conduit is stored in a basket or on a reel on the deck of the vessel and in one method is fed from the basket/reel to a vertical pipelay tower, where it is vertically aligned prior to laying the flexible tubular conduit underwater.

Guiding means in the form of an aligner, chute or a reel is positioned on the top of the pipelay tower and used to divert the flexible tubular conduit from a horizontal path to a vertical path for laying. The guiding means generally comprises a groove, channel or gutter for receiving the flexible tubular conduit and for facilitating the diverting of the flexible tubular conduit from the horizontal path to the vertical path.

The pipelay tower further comprises tensioning means, for example pipe tensioners comprising one or more caterpillar tracks, to facilitate the feeding of the flexible tubular conduit along the required vertical path. In use, the tensioning means grip the flexible tubular conduit and help feed and deploy the flexible tubular conduit towards the seabed.

A flexible tubular conduit is generally provided with one or more fittings, such as an end fitting and/or stiffener, which generally have an outer diameter that is greater than the outer diameter of the flexible tubular conduit.

Where a fitting is provided at the second end of the flexible tubular conduit, i.e. the terminal end of the flexible tubular conduit, the fitting will need to be lowered past the tensioning means for deployment subsea without the aid of the tensioning means.

GB2303897 describes a device for laying flexible conduits from a floating support. The device comprises a primary tensioning means, of the linear hoisting type to provide for the normal lowering of the flexible conduit, and a secondary tensioning means to provide for the lowering of the flexible conduit when the accessory has passed the primary tensioning means. The secondary tensioning means comprises at least one elongate movable handling member actuated by motor means in order to displace it vertically, and connected at one end to a clamp intended to be tightened around the flexible conduit.

SUMMARY OF THE INVENTION

It is an object of the invention to provide an improved transfer mechanism for providing vertical displacement of a fitting on a flexible tubular conduit and method thereof.

According to a first aspect of the invention, there is provided a transfer mechanism for providing linear vertical displacement of a fitting on a flexible tubular conduit comprising:

a clamping mechanism adapted to connect and secure a fitting on a flexible tubular conduit to the transfer mechanism; and a conveyor system configured to linearly displace the clamping mechanism from a first position towards a second position.

Preferably, the clamping mechanism is adapted to connect and secure an end fitting on a terminal end of a flexible tubular conduit to the transfer mechanism.

Optionally, the transfer mechanism further comprises an adapter for connecting said fitting to the clamping mechanism. In this way, the same clamping mechanism may be utilized to connect and secure fittings of different sizes and shapes to the transfer mechanism by means of the adapter.

In exemplary embodiments, the adapter comprises a clamp engaging portion for engagement with the clamping mechanism.

The adapter may comprise an eyelet at an end thereof for connecting the adapter to a cable. In this way, a cable may be connected to the adapter via the eyelet and used to support the weight of the fitting.

In an exemplary embodiment, the adapter is connectable to a fitting by one or more fasteners. The fasteners may be any suitable fasteners that may releasably connect the adapter to the fitting, for example bolts, a hub cap, or the like.

In an alternative embodiment, the adapter is connectable to a fitting by a loose fitting such as shackles, a master link assembly, slings or other loose fittings. In this embodiment, the adapter preferably comprises a padeye or the like for receiving the loose fitting. This allows the re-use of existing end fitting flanges and padeyes for shorter and smaller end fittings.

Optionally, the clamping mechanism comprises a pair of jaws movable between a first open position and a second closed or engaged position.

In exemplary embodiments, the clamping mechanism comprises a mechanical lock mechanism for securing the jaws in the second closed or engaged position.

In exemplary embodiments, the clamping mechanism comprises an internally protruding rim adapted to support the clamp engaging portion of the adapter.

Optionally, the conveyor system comprises at least one deployment cable for facilitating the linear displacement of the clamping mechanism from the first position towards the second position.

In exemplary embodiments wherein the conveyor system comprises at least one deployment cable, preferably the transfer mechanism further comprises a rotatable arm, wherein the at least one deployment cable depends from the rotatable arm.

In embodiments wherein the conveyor system comprises at least one deployment cable and the transfer mechanism comprises a rotatable arm, preferably the transfer mechanism further comprises a sheave associated with each of the at least one deployment cable and being connected to the rotatable arm.

Optionally, the or each sheave is adapted to be movable between an operating position and a stowed position.

The transfer mechanism may further comprise a multi-part linkage assembly adapted to connect the or each sheave to the rotatable arm and facilitate the movement of the or each sheave between the operating position and the stowed position.

Preferably, the multi-part linkage assembly is adapted to be movable between an extended position wherein the or each sheave is in the operating position, and a retracted position wherein the or each sheave is in the stowed position.

In exemplary embodiments, movement of the multi-part linkage assembly between the extended position and the retracted position causes rotational movement of the or each sheave relative to the rotatable arm.

Preferably, the operating position is a horizontal distance of at least 1 m from the stowed position.

The transfer mechanism may further comprise a frame coupled to each sheave and said clamping mechanism is suspended at a distance from the frame(s).

Preferably, the transfer mechanism further comprises at least one mechanical actuator adapted to adjust the distance of the clamping mechanism relative to the frame(s).

Preferably, the mechanical actuator comprises a hydraulic cylinder.

In exemplary embodiments, the conveyor system comprises a pair of spaced apart guide rails for facilitating the linear displacement of the clamping mechanism from the first position towards the second position.

In accordance with a second aspect, there is provide a pipelay tower comprising:
  a transfer mechanism for providing linear vertical displacement of a fitting on a flexible tubular conduit according to a first aspect of the invention.

Preferably, the clamping mechanism is movable vertically between the top of the pipelay tower and the bottom of the pipelay tower.

Preferably, the pipelay tower further comprises at least one tensioning means. In a preferred embodiment, said at least one tensioning means is retractable from a firing line of a flexible tubular conduit. In an alternative preferred embodiment, the at least one tensioning means comprises two or more discrete segments, being a first segment and at least a second segment, the segments being movable between: a closed position wherein the segments are conjoined to form an enclosing pipeline annulus able to support a flexible tubular conduit between the legs of the pipelay tower; and an open position wherein at least two of the segments are disconnected and separate.

In exemplary embodiments, the pipelay tower further comprises at least one access or work platform proximate the top of the pipelay tower, and a moving floor assembly associated with the at least one access/work platform.

Optionally, the moving floor assembly comprises a first floor section and a second floor section, the first and second floor sections being extendable towards each other and each comprise a notch therein adapted to receive a portion of a fitting therein.

Preferably, the first floor section and second floor section are vertically offset from each other such that second floor section will partially overlap the first floor section when the first and second floor sections are fully extended.

In accordance with a third aspect, there is provided a pipelay vessel comprising a pipelay tower according to the second aspect of the invention.

In accordance with a fourth aspect, there is provided a method of providing linear vertical displacement of a fitting on a flexible tubular conduit, comprising the steps of:
  (a) connecting a fitting on a flexible tubular conduit to a transfer mechanism for providing linear vertical displacement of a fitting on a flexible tubular conduit; and
  (b) actuating the transfer mechanism to provide linear vertical displacement of the fitting on a flexible tubular conduit from a top of a pipelay tower towards a bottom of the pipelay tower.

In accordance with a fifth aspect, there is provided a method of providing linear vertical displacement of a fitting on a flexible tubular conduit, comprising the steps of:
  (a) connecting a fitting on a flexible tubular conduit to a transfer mechanism for providing linear vertical displacement of a fitting on a flexible tubular conduit; and
  (b) actuating the transfer mechanism to provide linear vertical displacement of the fitting on a flexible tubular conduit from a subsea location towards a floor/table of a pipelay tower.

Preferably, the transfer mechanism in the fourth or fifth aspect of the invention is a transfer mechanism according to the first aspect of the invention.

BRIEF DESCRIPTION OF THE DRAWINGS

The invention will now be described by way of non-limiting example, with reference being made to the accompanying drawings, in which:

FIG. 14 depicts a second embodiment of a transfer mechanism in accordance with an aspect of the invention;

FIG. 15 is a diagrammatic view of the transfer mechanism of FIG. 14 with the end fitting assembly lowered to the pipelay tower floor; and FIG. 16 is a diagrammatic view of the transfer mechanism of FIG. 14 with jaws of the clamping mechanism disengaged.

DESCRIPTION OF PREFERRED EMBODIMENTS

The preceding discussion of the background to the invention is intended only to facilitate an understanding of the present invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, compounds described in conjunction with a particular aspect, embodiment or example of the invention are to be understood to be applicable to any other aspect, embodiment or example described herein unless incompatible therewith.

Figure 1:
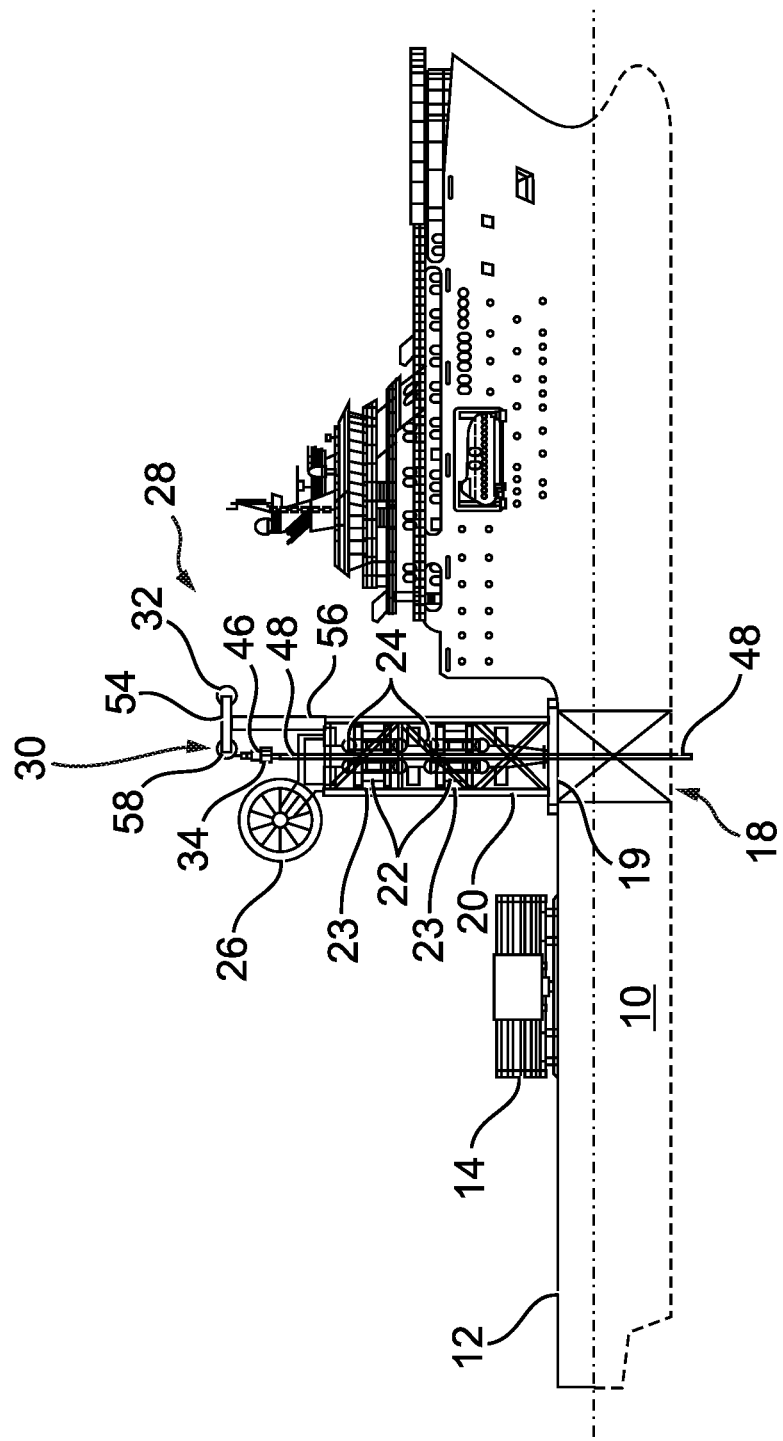
FIG. 1 is a schematic view of an embodiment of a pipelay vessel in accordance with an aspect of the invention.

Referring to FIG. 1, an embodiment of a pipelay vessel 10 in accordance with an aspect of the invention is shown.

The vessel 10 comprises a deck 12 on which is positioned a storage means 14 for storing a flexible tubular conduit 48. In the embodiment shown, the storage means 14 is in the form of a basket although it may take any suitable form. For example, the storage means 14 may comprise a reel.

The vessel 10 further comprises a moon pool 18 and an associated pipelay tower 20. The pipelay tower 20 is in the form of a vertical pipelay tower.

The pipelay tower 20 comprises at least one tensioning means 22 associated therewith. The at least one tensioning means 22 is provided to facilitate the feeding of a flexible tubular conduit, such as a flexible pipe, along the firing line for laying the flexible tubular conduit.

In the embodiment shown, the tensioning means 22 is in the form of pipe tensioners 23 comprising one or more caterpillar tracks 24 as known in the art. While three tensioners 23 are shown, it would be understood that the tensioning means 22 may comprise more or less than three tensioners.

Each tensioner 23 of the tensioning means 22 is movable between a first extracted position and a second stowed position such that the each tensioner 23 of the tensioning means 22 is retractable from the firing line of the flexible tubular conduit 48.

Guiding means 26 are located on top of the pipelay tower 20 to facilitate the diversion of the flexible tubular conduit 48 from a horizontal path to a vertical path for laying as known in the art. The guiding means 26 comprises a channel (not shown) for receiving the flexible tubular conduit 48 therein. In the embodiment shown in FIG. 1, the guiding means 26 is in the form of a reel although it would be understood that the guiding means 26 may take any other suitable form, for example the guiding means 26 may be in the form of an aligner or a chute.

A transfer mechanism 28 is positioned on top of the pipelay tower 20 and is configured to provide linear vertical displacement of a fitting 46 on the flexible tubular conduit 48.

Figure 2:
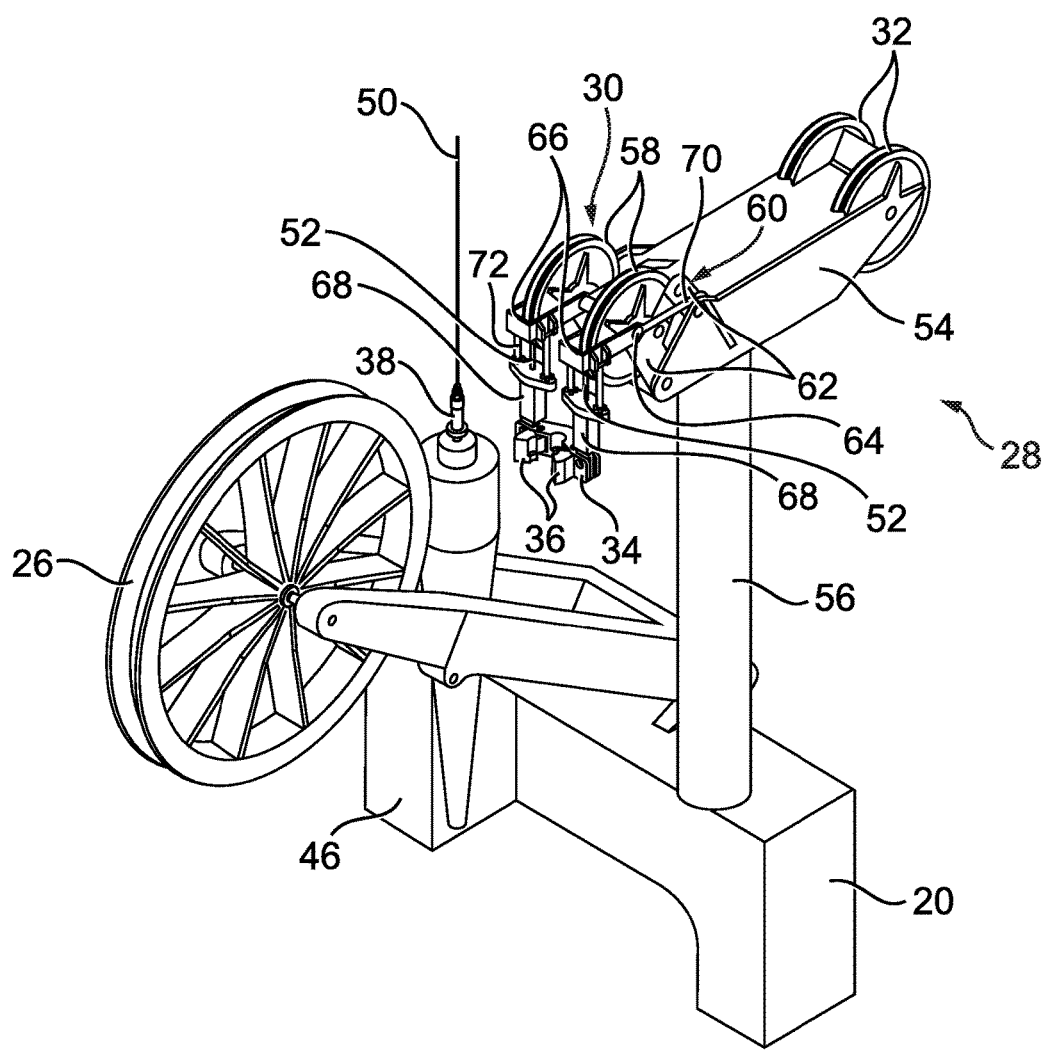
FIG. 2 is a perspective view of a first embodiment of a transfer mechanism in accordance with an aspect of the invention.

Referring to FIG. 2, a first embodiment of a transfer mechanism 28 in accordance with an aspect of the invention is shown. The transfer mechanism 28 comprises a clamping mechanism 34 adapted to connect and secure the fitting 46 to the transfer mechanism 28, and a conveyor system 30 adapted to linearly displace the clamping mechanism 34 from a first position towards a second position. The first position will generally correspond to a position proximate the top of the pipelay tower 20 and the second position will generally correspond to a position proximate the bottom of the pipelay tower 20.

The conveyor system 30 can also be adapted to be used to facilitate the abandoning and recovering of a flexible tubular conduit from the seabed to the deck 12 of the vessel 10.

The transfer mechanism 28 further comprises actuation means (not shown) for actuating the transfer mechanism 28. The actuation means may be any suitable device for actuating the conveyor system 30. For example, the actuation means may be in the form of an electronic or hydraulic motor.

Figure 3:
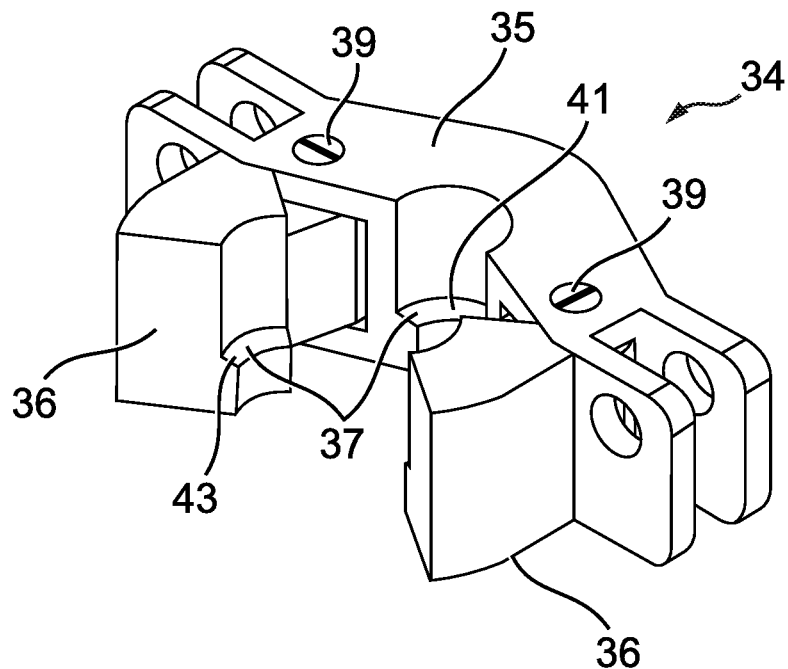
FIG. 3 is a perspective view of an embodiment of a clamp mechanism forming part of a transfer mechanism of FIG. 2 with the jaws in the first open position.
Figure 4:
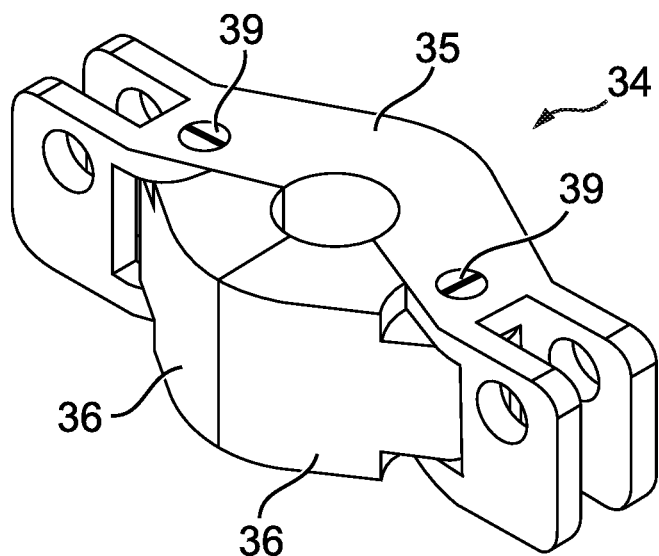
FIG. 4 is a perspective view of an embodiment of a clamp mechanism forming part of a transfer mechanism of FIG. 2 with the jaws in the second closed position.
Figure 5:
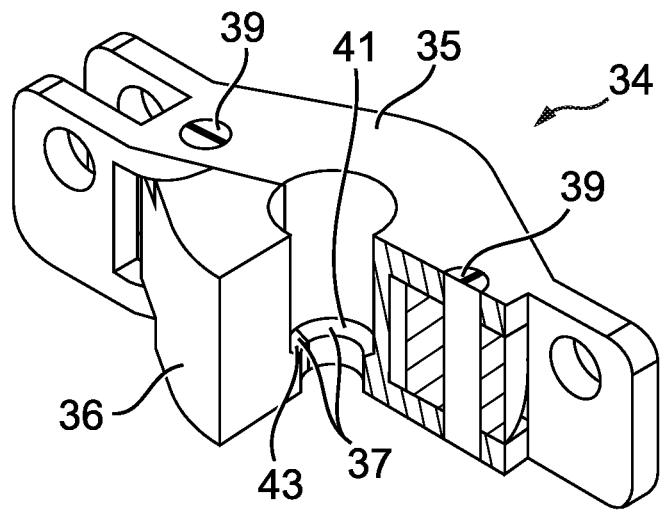
FIG. 5 is a perspective view similar to FIG. 4 with one of the jaws omitted to show an embodiment of the internally protruding rim of the clamping mechanism adapted to support the clamp engaging portion of the adapter.

Referring to FIGS. 3 to 5, an embodiment of the clamping mechanism 34 is shown. The clamping mechanism 34 comprises a body portion 35 and a pair of jaws 36 pivotably connected to the body portion by pins 39. The jaws 36 are movable between a first open position as shown in FIG. 3 and a second closed position as shown in FIG. 4. The jaws 36 can be designed to be manually, mechanically and/or electrically actuated as required. For example, the jaws 26 may be mechanically actuated by means of a hydraulic cylinder mechanism.

The clamping mechanism 34 comprises a mechanical lock mechanism (not shown) for securing the jaws 36 in the second closed position.

The clamping mechanism 34 comprises an internally protruding rim 37 adapted to support a clamp engaging portion 42 of an adapter 38. In the embodiment shown, the protruding rim 37 is defined by a flange section 43 on each jaw 36 and a flange section 41 on the body portion 35. FIG. 5 shows the clamping mechanism 34 with the jaws 36 in the closed position with one jaw 36 omitted showing the internally protruding rim 37 defined by the flange sections 41, 43 of the body portion 35 and jaw 36.

Figure 6:
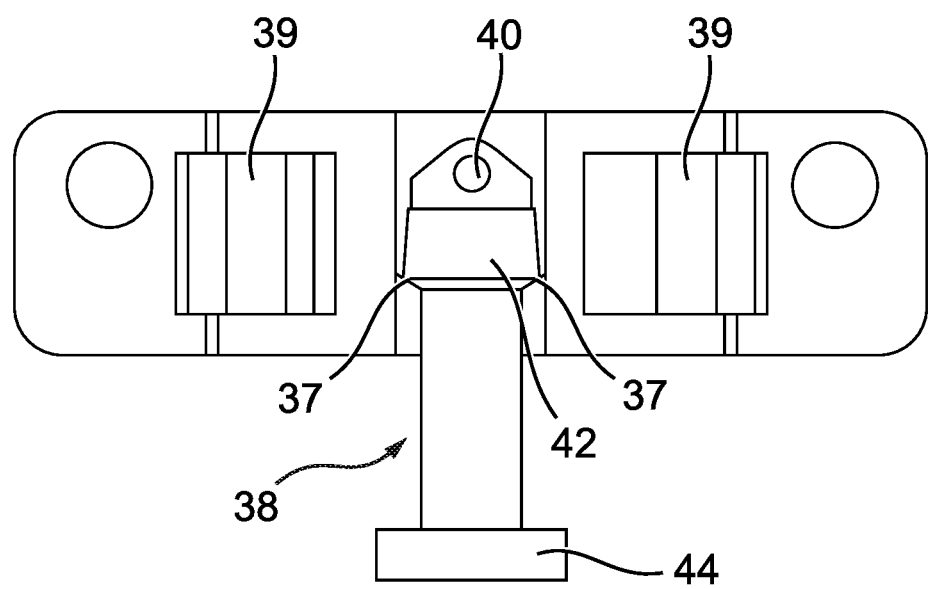
FIG. 6 is a schematic view depicting the clamp engaging portion of the adapter supported by the internally protruding rim of the clamping mechanism.

Referring to FIG. 6, an embodiment of the adapter 38 is shown supported by the internal rim 37 of the clamping mechanism 34. The adapter 38 is configured to connect the fitting 46 to the clamping mechanism 34. In use, the adapter 38 is connected to the fitting 46 before the commencement of the transfer operation.

The adapter 38 comprises a clamp engaging portion 42 for engagement with the internally protruding rim 37 of the clamping mechanism 34.

The adapter 38 further comprises an eyelet 40 at an end thereof for connecting the adapter 38 to a lifting cable 50 used to up-end the fitting 46 into a position aligned with the firing line and to help position the adapter 38 inside the clamping mechanism 34.

In the embodiment shown, the adapter 38 comprises a flange portion 44 for connecting the adapter 38 to the fitting 46 by means of one or more fasteners (not shown). The fasteners may be any suitable fastener known in the art, for example, the adapter 38 may be connected to the fitting 46 by means of bolts or a hub clamp.

In an alternative embodiment (not shown), the adapter 38 comprises at its lower extremity a padeye or second eyelet for connecting the adapter 38 to the fitting 46 by means of conventional loose fittings such as shackles, slings, mater link assemblies and the like.

The conveyor system 30 comprises at least one deployment cable 52 for facilitating the linear displacement of the clamping mechanism 34 from the first position towards the second position. In the embodiment shown, the conveyor system 30 comprises two deployment cables 52.

The transfer mechanism 28 further comprises a rotatable arm 54 rotatably mounted on a shaft 56 on the top of the pipelay tower 20. The rotatable arm 54 comprises a plurality of pulleys 32 mounted on a back end thereof for facilitating the release and retraction of the deployment cables 52.

The transfer mechanism 28 further comprises a sheave 58 associated with each of the deployment cables 52 connected to the rotatable arm 54 at a front end thereof.

Each sheave 58 is adapted to be movable between an operating position as shown in FIG. 7a and a stowed position as shown in FIG. 7b.

The sheaves 58 are each connected to rotatable arm 54 by a multi-part linkage assembly 60 which facilitates the movement of the sheaves 58 between the operating position and the stowed position.

Figure 7:
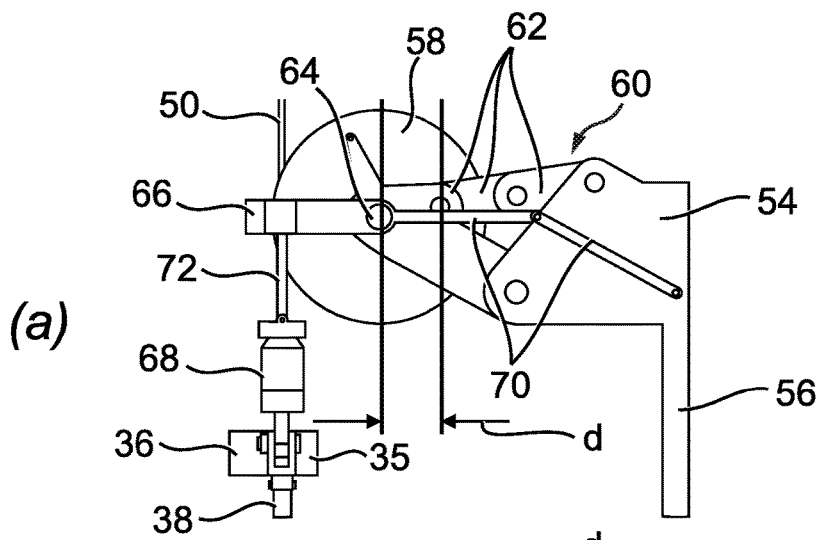
FIGS. 7 and 8 depict the multi-part linkage assembly and sheaves of the transfer mechanism of FIG. 2 with the multi-part linkage in the extended position and retracted position.
Figure 7:
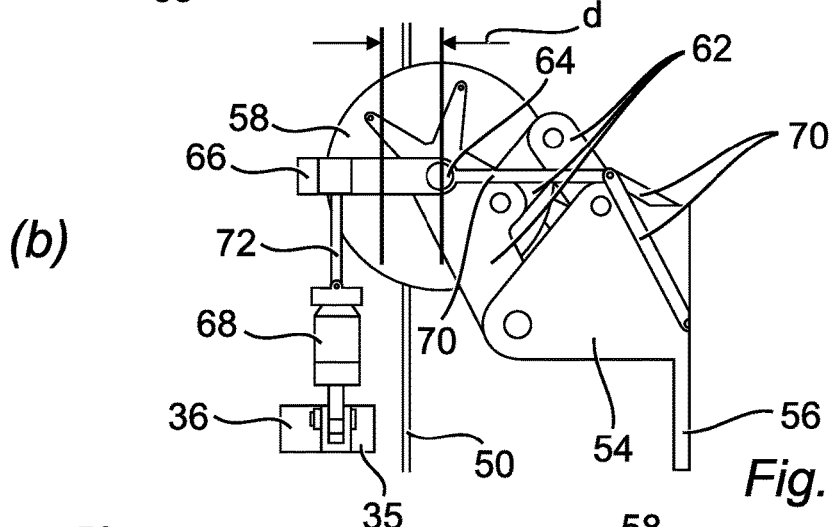

As shown in FIG. 7, the multi-part linkage assembly 60 is movable between an extended position (FIG. 7a) wherein the sheaves 58 are in the operating position, and a retracted position (FIG. 7b) wherein the sheaves 58 are in the stowed position.

The multi-part linkage assembly 60 comprises a plurality of pivotally connected linkage members 62 arranged such that movement of the multi-part linkage assembly 60 between the extended position and the retracted position causes rotational movement of the sheaves 58 relative to the rotatable arm 54 (see FIG. 7).

The linkage members 62 are arranged and sized such that the position of the sheave pin 64 of the sheaves 58 relative to the rotatable arm 54 when the sheaves are in the operating position is located at a horizontal distance d of at least 1 m from the position of the sheave pin 64 of the sheaves 58 relative to the rotatable arm 54 when the sheaves are in the stowed position.

The transfer mechanism 28 further comprises a frame 66 coupled to each sheave 58. The frames 66 are coupled to the sheaves 58 via the sheave pin 64. The frames 66 are linked to the rotatable arm 54 by linkage members 70 such that the frames 66 maintain substantially the same horizontal orientation during movement of the sheaves 58 between the operating position and the stowed position. The frames 66 and linkage members 70 are configured to act like a swivel and allow the sheaves 58 to rotate between the operating and stowed positions. The frames 66 and linkage members 70 when considered together will be hereinafter referred to as the "swivel" convenience.

The clamping mechanism 34 is connected to the swivel and is suspended from the frames 66 by a least one mechanical actuator 68. In the embodiment shown, a mechanical actuator 68 is connected to each frame 66 at a first end thereof and connected to the clamping mechanism 34 at a second end thereof.

Each mechanical actuator 68 is adapted to adjust the distance of the clamping mechanism 34 relative to the frames 66 and each comprises a pair of hydraulic cylinders 72 for varying the distance of the clamping mechanism 34 relative to the frames 66 and to ease/facilitate the connection with the adapter 38.

Figure 8:
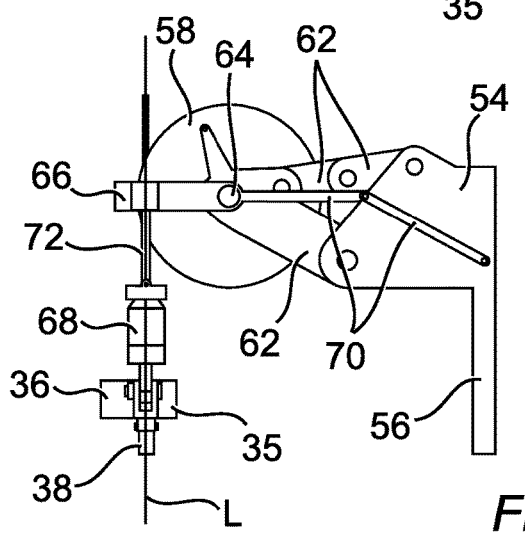
Figure 8:
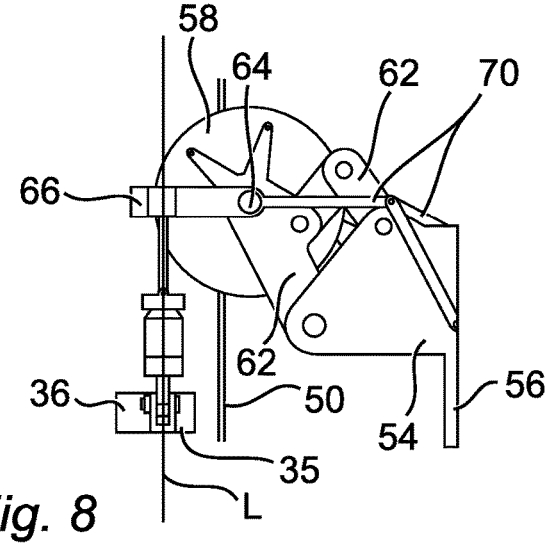

Due to the fact that the frames 66 maintain substantially the same horizontal orientation during movement of the sheaves 58 between the operating position and the stowed position, the hydraulic cylinders 72 will remain parallel to the firing line at all times. FIG. 8 depicts a side view of the sheaves 58 in the operating position and stowed position with a line L running through the longitudinal axis of the hydraulic cylinders 72 to indicate the orientation of the hydraulic cylinders 72. As can be seen, the orientation of the longitudinal axis of the hydraulic cylinders 72 remains vertical when the sheaves 58 are in the operating position and stowed position.

While not specifically described or shown, the pipelay vessel 10 may comprise one or more features which are commonly incorporated in pipelay vessels known in the art, for example work table(s), access platform(s) etc.

The method of providing linear vertical displacement of a fitting 46, in the form of an end fitting and attached bend stiffener (herein after referred to as "end fitting assembly" for simplicity), on a terminal end of the flexible tubular conduit 48 will now be described with particular reference to FIGS. 9a to 9f. The flexible tubular conduit 48 is shown in the form of a flexible pipe for conveying hydrocarbons.

The section of the flexible tubular conduit 48 forward of the end fitting assembly 46 is first removed from the basket 14.

The end fitting assembly 46 is then connected to the terminal end of the flexible tubular conduit 48, if the end fitting assembly 46 has not already been connected to the terminal end of the flexible tubular conduit 48 prior to storage of the flexible tubular conduit 48 in the basket 14.

The adapter 38 is then connected to the end fitting assembly 46 by means of fasteners, a hub clamp or loose fittings as appropriate. Where the end fitting assembly 46 is connected to the flexible tubular conduit 48 prior to storage in basket, the adapter 38 is connected to the end fitting assembly 46 after the end fitting assembly 46 has been removed from the basket prior to transfer of the flexible tubular conduit 48 to the guiding means. Again, the adapter 38 may be connected to the end fitting assembly 46 prior to storage of the flexible tubular conduit 48 in the basket 14.

The section of the flexible conduit 48 forward of the end fitting assembly 46 is then fed over the guiding means along the path of the firing line through the tensioning means 28 as known in the art.

A lifting cable 50 connected to a winch or crane is then connected to the adapter 38.

The winch/crane is utilised to move the end fitting assembly 46 from a position upstream of the guiding means 26 to a position downstream of the guiding means 26.

Figure 9A:
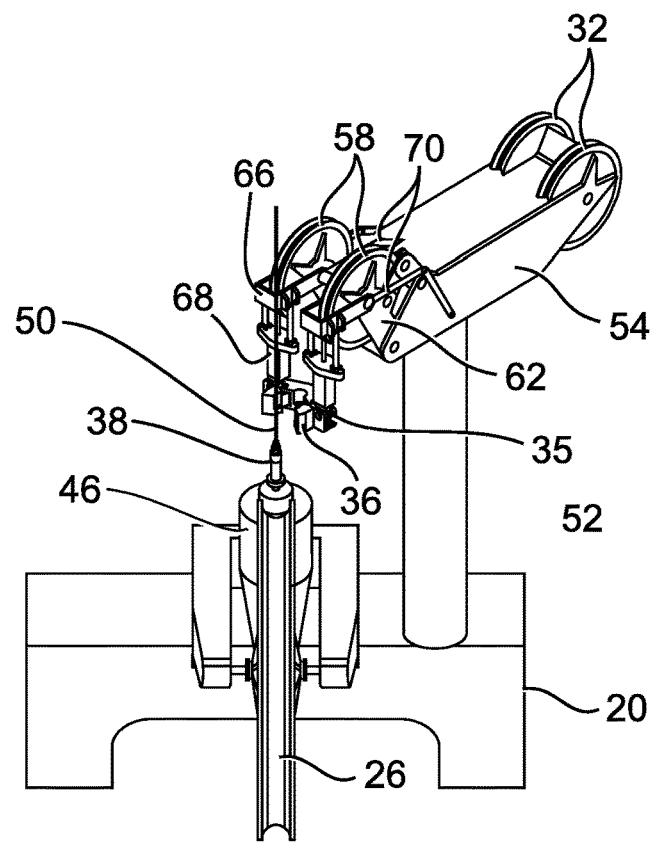
FIGS. 9a-9f are diagrammatic views of a method of providing linear vertical displacement of a fitting on a flexible tubular conduit utilizing the transfer mechanism of FIG. 2.

When the end fitting assembly 46 is located downstream of the guiding means, the rotatable arm 54 is rotated so as to be in line with the end fitting assembly 46 (see FIG. 9a).

Figure 9B:
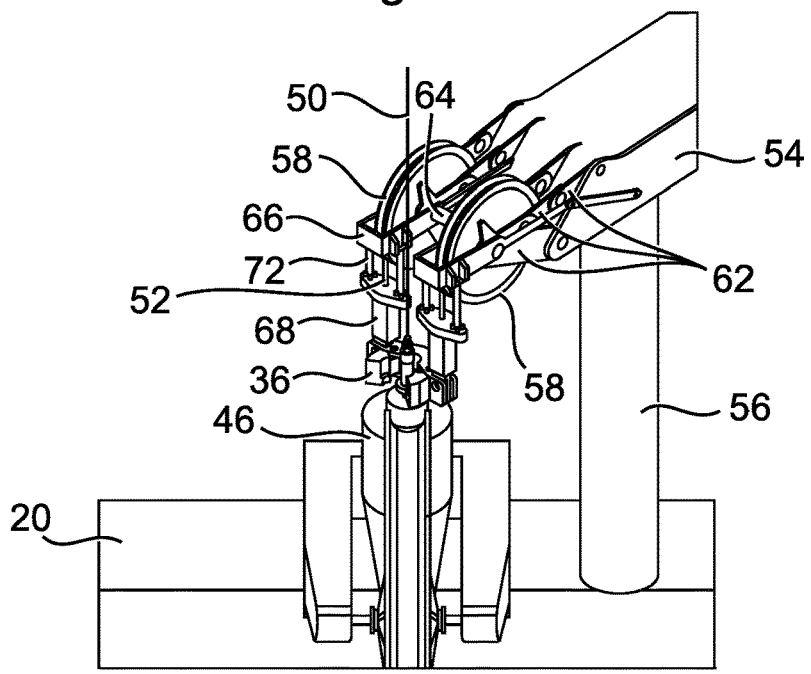

The sheaves 58 are then moved from the stowed position to the operating position (see FIG. 9b). When in the operating position, the clamping mechanism 34 will be coplanar with the firing line of the flexible tubular conduit 48.

Figure 9C:
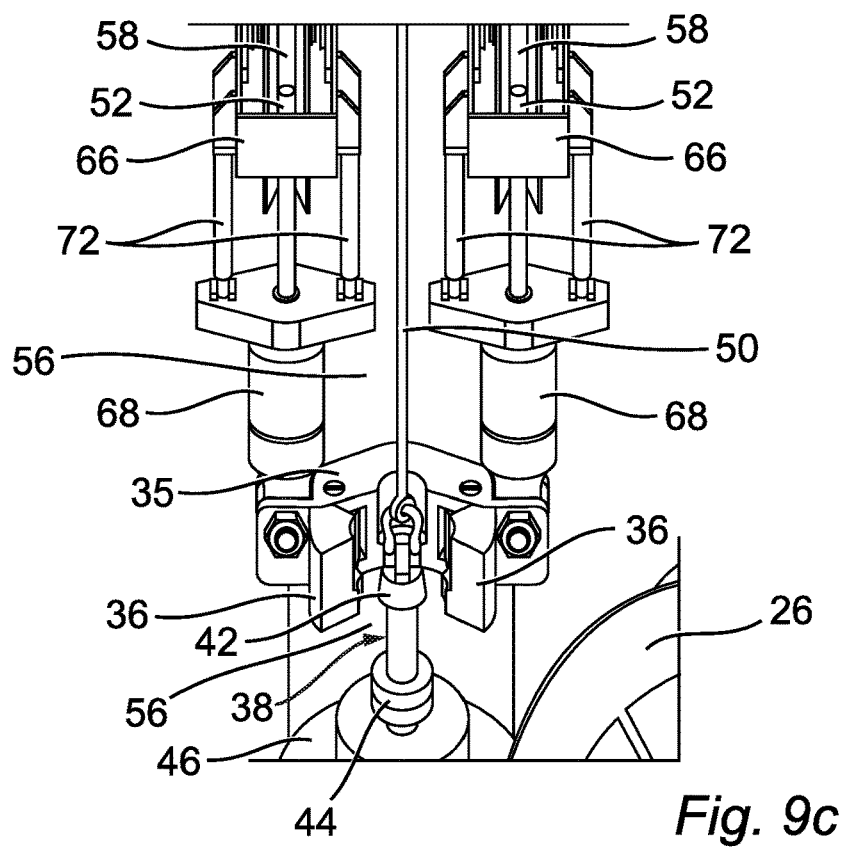
Figure 9D:
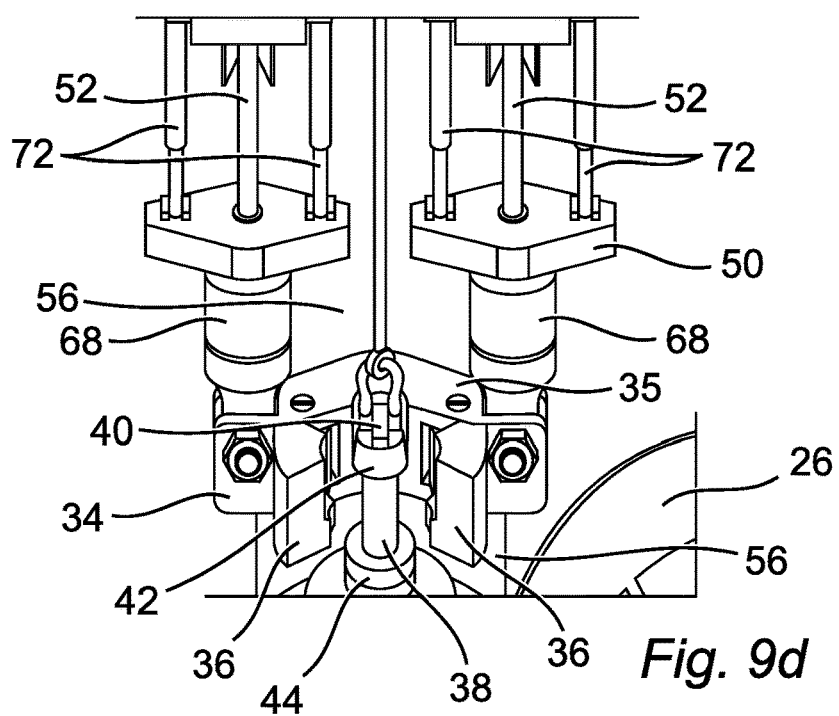

If the clamping mechanism 34 is not aligned with the clamp engagement portion 42 of the adapter 38, as shown in FIG. 9c, the mechanical actuator 68 is actuated and overall length of the hydraulic cylinders 72 increased until the clamping mechanism 34 is aligned with the clamp engagement portion 42 of the adapter 38 as shown in FIG. 9*d*.

Figure 9E:
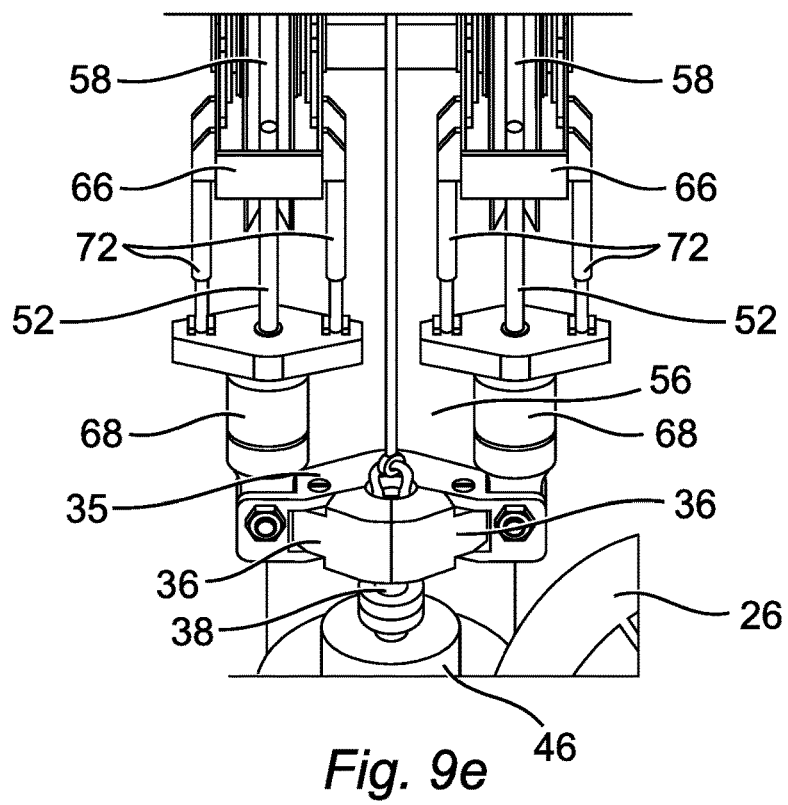
Figure 9F:
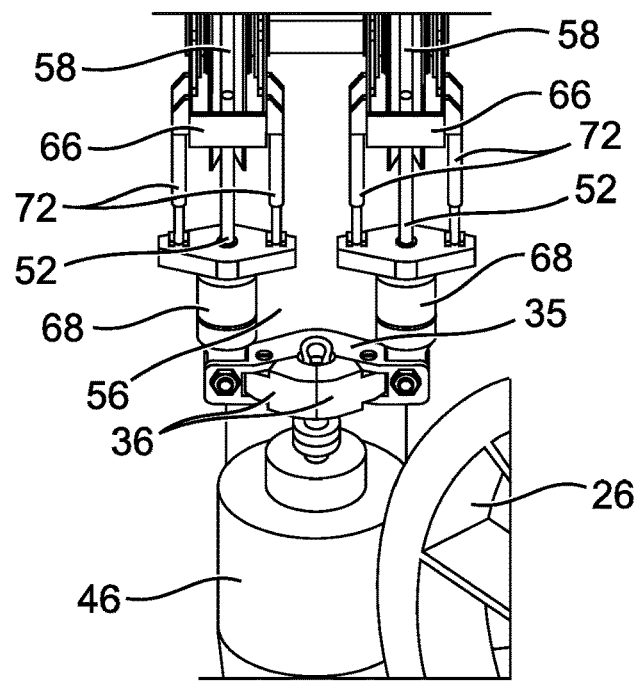

The jaws 36 are then moved from the first open position to the second closed position and the mechanical lock mechanism applied in order to secure the jaws 36 in the second closed position (see FIG. 9*e*).

Once the clamping mechanism 34 is secured to the adapter 38, the lifting cable 50 can be disconnected from the eyelet 40 of the adapter 38.

The catenary load is then transferred from the tensioners 23 of the tensioning means 22 to the clamping mechanism 34. Then the tensioners 23 of the tensioning means 22 are then retracted from their extracted position to their stowed position in order to move them away from the firing line of the flexible tubular conduit 48 and not hinder the descent of the end fitting assembly 46.

Once the tensioners are retracted, the transfer mechanism 28 is actuated and the conveyor system 30 initiated. This results in the deployment of the deployment cables 52 and hence the lowering of the clamping mechanism 34 and end fitting assembly 46 towards the bottom of the pipelay tower 20.

The clamping mechanism 34 is lowered until the end fitting assembly 46 comes into contact with the pipelay tower floor/table 19 and the catenary load is transferred to the pipelay tower floor/table 19 through a hang-off collar (not shown). The hang-off collar may or may not be directly integrated to the pipelay tower floor/table 19.

Once the catenary load is transferred to the pipelay tower floor/table 19, the jaws 36 of the clamping mechanism 34 are opened and the clamping mechanism 34 can be returned to its original position.

Referring to FIGS. 10 to 13, a section of a second embodiment of a pipelay vessel in accordance with an aspect of the invention is shown. FIGS. 10 to 13 depict the area proximate the top of the pipelay tower.

The second embodiment is very similar to the first embodiment and the same reference numeral has been used for identical features.

The difference between the first embodiment and the second embodiment is that pipelay tower comprises a moving floor assembly 82 associated with the access platform 80. In the embodiment shown, the pipelay tower comprises an access platform 80 on either side of the firing line of the flexible tubular conduit 48.

Figure 10:
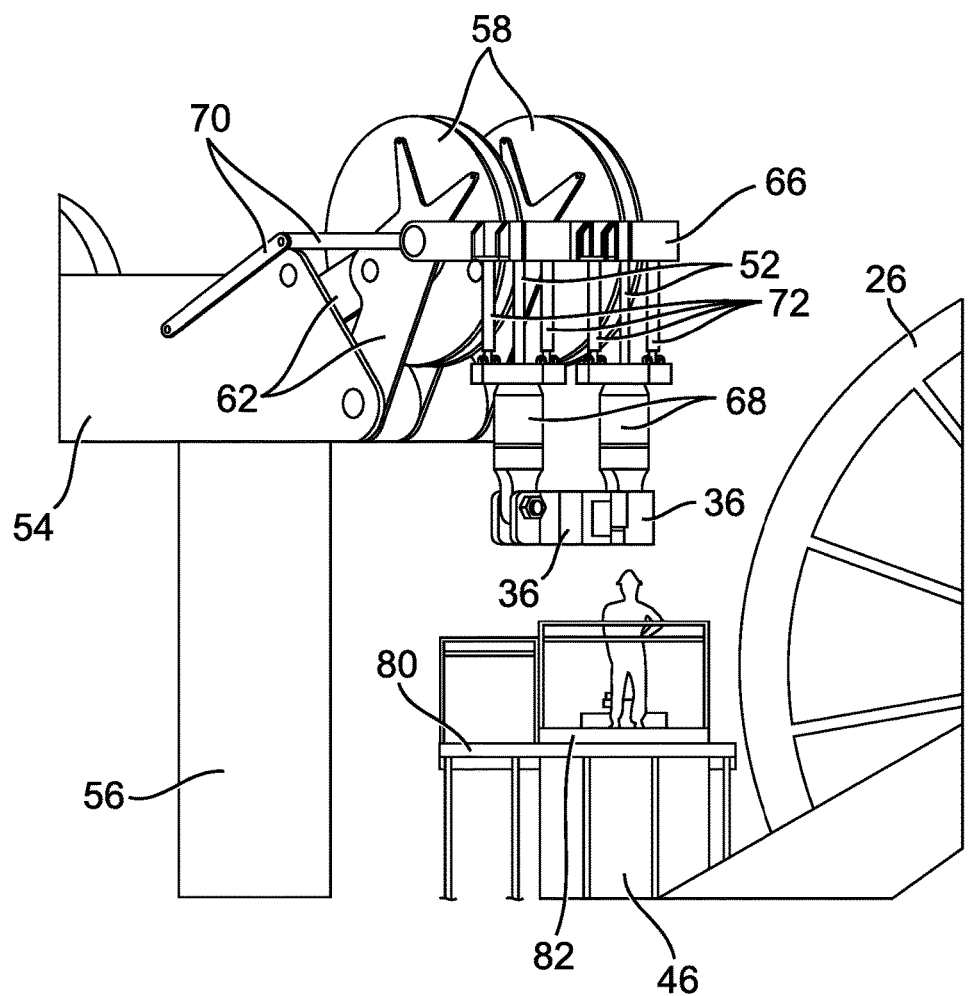
FIGS. 10-13 are diagrammatic views of a moving floor forming part of an embodiment of a pipelay tower in accordance with an aspect of the invention.
Figure 11:
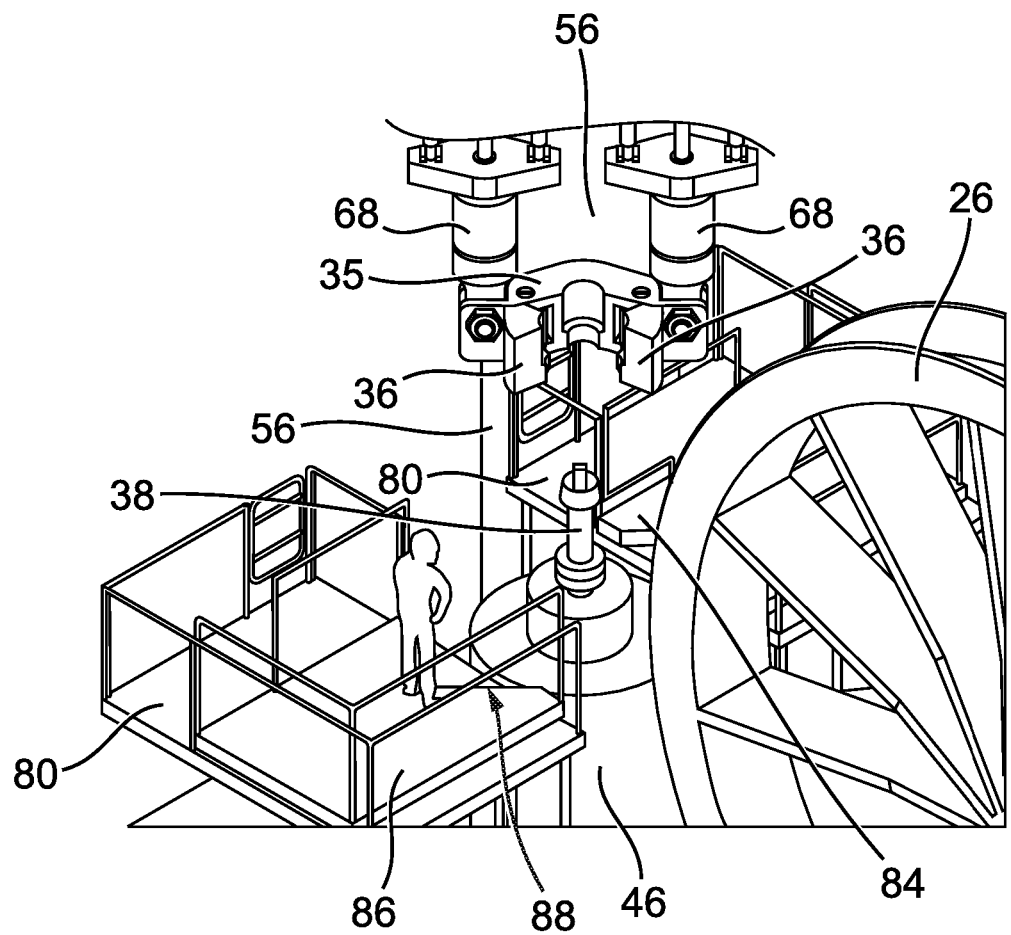
Figure 12:
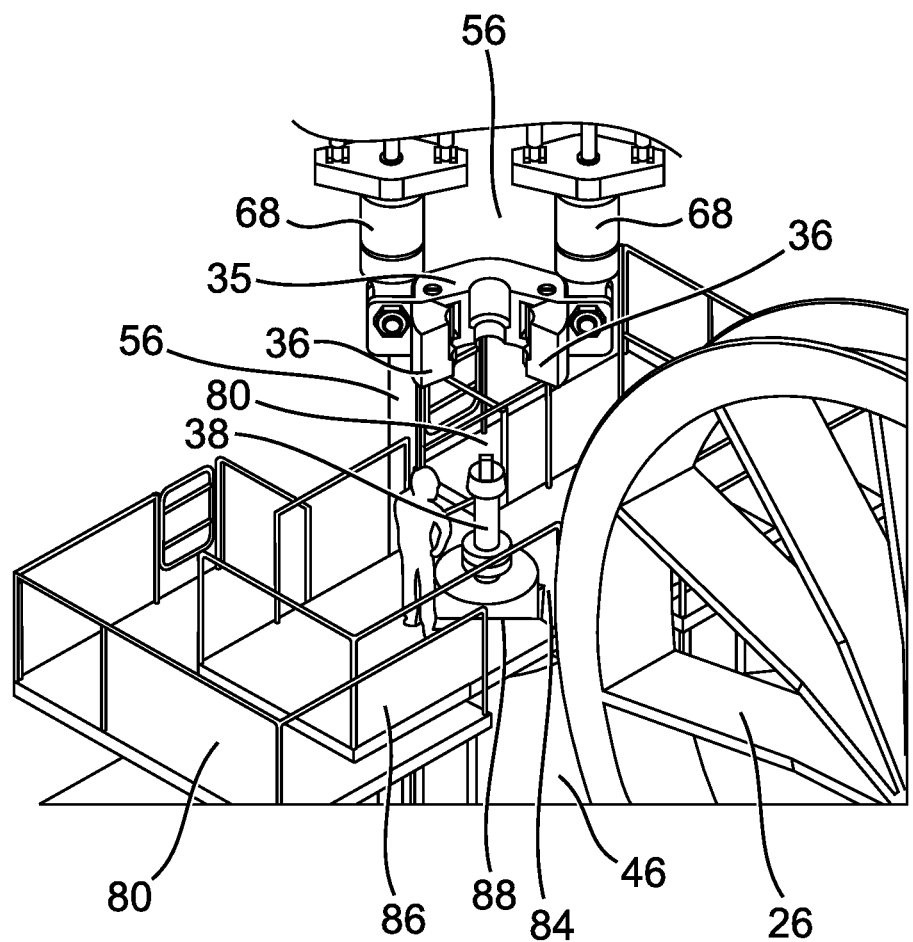
Figure 13:
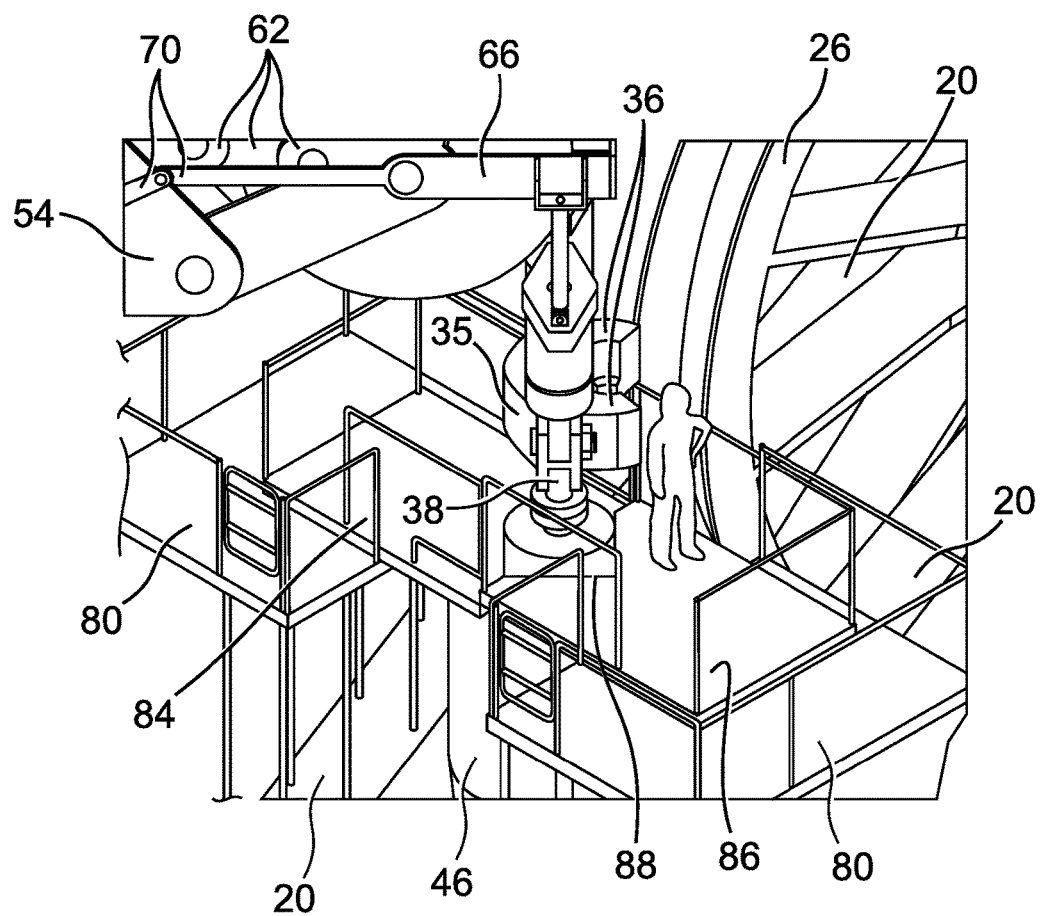

The access platforms 80 are at a height such that when the sheaves 58 are in the stowed position, the sheaves 58 clear the access platforms 80 as shown in FIG. 10.

The moving floor assembly 82 comprises first and second floor sections 84, 86 which are extendable towards each other in a direction towards the firing line of the flexible tubular conduit 48. Each floor section 84, 86 is mounted on a corresponding access platform 80.

Each floor section 84, 86 comprises a centrally positioned recess or notch 88 at an end thereof proximate the firing line. In the embodiment shown, the notch 88 in each floor section 84, 86 is substantially V-shaped.

The first and second floor sections 84, 86 are vertically offset from each other such that the second floor section 86 will partially overlap the first floor section 84 when the first and second floor sections 84, 86 are fully extended. This means that the floor sections 84, 86 will be able to surround varying sizes of end fitting assemblies 46.

Referring to FIGS. 14 to 16, a second embodiment of a transfer mechanism 128 and method for providing linear vertical displacement of a fitting on a flexible tubular conduit in accordance with the invention is shown.

Reference numerals for similar features to those of the previously described embodiments have been increased by a factor of 100 for ease of reference, for example, the end fitting assembly which was referred to with reference numeral 46 in the previously described embodiments will have a reference numeral 146.

The transfer mechanism 128, like in the first embodiment, comprises a clamping mechanism 134 adapted to connect and secure the end fitting assembly 146 to the transfer mechanism 128 and a conveyor system 130 adapted to linearly displace the clamping mechanism 134 from a first position towards a second position. The first position will generally correspond to a position proximate the top of the pipelay tower 120 and the second position will generally correspond to a position proximate the bottom of the pipelay tower 120, although it would be understood that the transfer mechanism 128 could be used to abandon and recover a flexible tubular conduit 148 from the seabed to the pipelay tower floor/table.

The transfer mechanism 128 further comprises actuation means (not shown) for actuating the transfer mechanism. The actuation means may be any suitable device for actuating the conveyor system 130. For example, the actuation means may be in the form of an electronic or hydraulic motor.

The clamping mechanism 134 comprises a clamp portion 135 and a pair of jaws 136 adapted to engage with the clamp portion 135. The jaws 136 are movable laterally between a first open position (see FIG. 16) and a second engaged position wherein the jaws 136 engage with the clamp portion 135 (see FIG. 14). Actuation means (not shown) in the form of a hydraulic cylinder is connected to each jaw 136 to facilitate the lateral movement there of.

The clamping mechanism 134 comprises a mechanical lock mechanism (not shown) for securing the jaws 136 in the second engaged position.

The clamp portion 135 comprises two half collars which are sized and shaped to fasten around a section of the end fitting assembly 146.

The each jaw 136 comprises a protruding flange 137 which is adapted to be received in a recessed section 145 in the clamp portion 135 when the jaws 136 are in the second engaged position. It will be understood that each jaw 136 may instead comprise a recessed section adapted to receive a protruding flange extending from the clamp portion or that the jaws 136 and clamp portion 135 may comprise mutually engagable parts which connect or link together when the jaws 136 are in the second engaged position.

The conveyor system 130 comprises a pair of spaced apart guide rails 194 and a support arm 196 associated with each guide rail 194, for facilitating the linear displacement of the clamping mechanism 134 from the first position towards the second position.

A jaw 136 of the clamping mechanism 134 is mounted on an end of each of the support arms 196.

Each support arm 196 comprises an access platform (not shown) mounted thereon. The access platforms are coupled to a respective jaw 136 such that it moves with the jaw 136 when the jaw 136 is translated laterally.

The conveyor system 130 further comprises on or more of deployment cables 152 adapted to provide additional safety to the conveyor system 130. In the embodiment shown, the conveyor system 130 comprises a pair of deployment cable 152 with a deployment cable connected to each jaw 136 of the clamping mechanism 134. It would be understood that the deployment cable(s) 152 may alternatively be connected to an alternative part of the clamping mechanism 134 or to the support arms 196.

A sheave (not shown) associated with each of the deployment cables 152 is positioned on the top of the pipelay tower 120.

The method of providing linear vertical displacement of an end fitting assembly 146 on a terminal end of the flexible tubular conduit 148 will now be described. The flexible tubular conduit 148 is shown in the form of a flexible pipe for conveying hydrocarbons.

The clamp portion 135 is connected and secured to the end fitting assembly 146 prior to movement of the end fitting assembly 146 from a position upstream of the guiding means (not shown) to a position downstream of the guiding means.

Following the movement of the end fitting assembly 146 from a position upstream of the guiding means to a position downstream of the guiding means by a crane (not shown) or other suitable means, the end fitting assembly 146 is lowered until the jaws 136 of the clamping mechanism 134 are aligned with the clamp portion 135 of the clamping mechanism 134.

The jaws 136 are then moved from the first open position to the second engaged position and the mechanical lock mechanism applied in order to secure the jaws 136 in the second engaged position.

Once the clamping mechanism 134 is secured to the end fitting assembly 146, the lifting cable can be disconnected from the eyelet 140 of the adapter 138.

The catenary load is then transferred from the tensioners of the tensioning means (not shown) to the clamping mechanism 134.

The tensioners of the tensioning means are then operated to disengage from the flexible tubular conduit 148 and retracted from their extracted position to their stowed position in order to move them away from the firing line of the flexible tubular conduit 148.

Once the tensioners are retracted, the transfer mechanism 128 is actuated and the conveyor system 130 initiated. This results in the descent of the support arms 196 along the guide rails 194 and hence the lowering of the clamping mechanism 134 and end fitting assembly 146 towards the bottom of the pipelay tower 120.

The transfer mechanism is lowered until the end fitting assembly 146 comes into contact with the pipelay tower floor/table and the catenary load is transferred to the pipelay tower floor/table through a hang off collar (not shown). The hang off collar may or may not be integrated to the pipelay tower floor/table.

Once the catenary load is transferred to the table, the jaws 136 are opened and can be moved back towards the top of the pipelay tower 120.

While the invention has been described with reference to the laying/recovering of flexible tubular conduits in the form of flexible tubular conduits for conveying hydrocarbons, it would equally be applicable to the laying/recovering of other flexible tubular conduits, for example power cables, umbilicals, data cables etc.

While the invention has been described with reference to the utilization of an adapter to connect a fitting to the transfer mechanism, the clamping mechanism may be configured to clamp onto a portion of the fitting directly.

In addition, the clamping mechanism of the second embodiment of the transfer mechanism of the invention may be utilised with a conveyor system as described as forming part of the first embodiment of the transfer mechanism of the invention.

What is claimed is:

1. A transfer mechanism for providing linear vertical displacement of a fitting on a flexible tubular conduit comprising:
   a clamping mechanism adapted to connect and secure a fitting on a flexible tubular conduit to the transfer mechanism;
   a conveyor system configured to linearly displace the clamping mechanism from a first position towards a second position, the conveyor system comprises at least one deployment cable for facilitating the linear displacement of the clamping mechanism from the first position towards the second position;
   a rotatable arm, wherein the at least one deployment cable depends from the rotatable arm;
   a sheave associated with each of the at least one deployment cable and being connected to the rotatable arm, the or each sheave is adapted to be moveable between an operating position and a stowed position;
   a multi-part linkage assembly configured to connect the or each sheave to the rotatable arm and to facilitate the movement of the or each sheave between the operating position and the stowed position, the multi-part linkage assembly is adapted to be moveable between an extended position wherein the or each sheave is in the operating position, and a retracted position wherein the or each sheave is in the stowed position; and
   wherein movement of the multipart linkage assembly between the extended position and the retracted position causes rotational movement of the or each sheave relative to the rotatable arm.

2. The transfer mechanism according to claim 1 wherein the clamping mechanism is configured to connect and secure an end fitting on a terminal end of a flexible tubular conduit to the transfer mechanism.

3. The transfer mechanism according to claim 1, further comprising an adapter for connecting the fitting to the clamping mechanism.

4. The transfer mechanism according to claim 3, wherein the adapter comprises a clamp engaging portion for engagement with the clamping mechanism.

5. The transfer mechanism according to claim 3, wherein the adapter comprises an eyelet at an end of the adapter for connecting the adapter to a cable.

6. The transfer mechanism according to claim 1, wherein the adapter is connectable to the fitting by one or more of fasteners, a hub clamp, or a loose fitting.

7. The transfer mechanism according to claim 1, wherein the clamping mechanism comprises a pair of jaws moveable between a first open position and a second closed position.

8. The transfer mechanism according to claim 7, wherein the clamping mechanism comprises a mechanical lock mechanism for securing the jaws in the second closed or engaged position.

9. The transfer mechanism according to claim 8, wherein the adapter comprises a clamp engaging portion for engagement with the clamping mechanism, and wherein the clamping mechanism comprises an internally protruding rim adapted to support the clamp engaging portion of the adapter.

10. The transfer mechanism according to claim 1, wherein the clamping mechanism comprises a pair of jaws moveable between a first open position and a second engaged position.

11. The transfer mechanism according to claim 1, wherein the operating position is a horizontal distance of at least 1 m from the stowed position.

12. The transfer mechanism according to claim 1, further comprising a frame coupled to each sheave and said clamping mechanism is suspended at a distance from the frame(s).

13. The transfer mechanism according to claim 12, further comprising at least one mechanical actuator adapted to adjust the distance of the clamping mechanism relative to the frame (s).

14. The transfer mechanism according to claim 13, wherein the mechanical actuator comprises a hydraulic cylinder.

15. The transfer mechanism according to claim 1, wherein the conveyor system comprises a pair of spaced apart guide rails for facilitating the linear displacement of the clamping mechanism from the first position towards the second position.

16. A pipelay tower comprising:
a transfer mechanism for providing linear vertical displacement of a fitting on a flexible tubular conduit according to claim 1.

17. The pipelay tower according to claim 16, wherein the clamping mechanism is moveable vertically between the top of the pipelay tower and the bottom of the pipelay tower.

18. The pipelay tower according to claim 16, further comprising at least one tensioning means, said at least one tensioning means being retractable from a firing line of a flexible tubular conduit.

19. The pipelay tower according to claim 16, further comprising one access or work platform proximate the top of the pipelay tower, and a moving floor assembly associated with the at least one access/work platform.

20. The pipelay tower according to claim 19, wherein the moving floor assembly comprises a first floor section and a second floor section, the first and second floor sections being extendable towards each other and each comprise a notch therein adapted to receive a portion of the fitting therein.

21. The pipelay tower according to claim 20, wherein the first floor section and second floor section are vertically offset from each other such that second floor section will partially overlap the first floor section when the first and second floor sections are fully extended.

* * * * *